(12) United States Patent
Kawamoto et al.

(10) Patent No.: US 10,610,945 B2
(45) Date of Patent: Apr. 7, 2020

(54) ARC WELDING CONTROL METHOD

(71) Applicant: Panasonic Intellectual Property Management Co., Ltd., Osaka (JP)

(72) Inventors: Atsuhiro Kawamoto, Hyogo (JP); Junji Fujiwara, Osaka (JP); Yukinori Hirota, Hyogo (JP); Noriyuki Matsuoka, Osaka (JP); Kaito Matsui, Osaka (JP)

(73) Assignee: PANASONIC INTELLECTUAL PROPERTY MANAGEMENT CO., LTD., Osaka (JP)

( * ) Notice: Subject to any disclaimer, the term of this patent is extended or adjusted under 35 U.S.C. 154(b) by 149 days.

(21) Appl. No.: 14/569,906

(22) Filed: Dec. 15, 2014

(65) Prior Publication Data

US 2015/0096965 A1 Apr. 9, 2015

Related U.S. Application Data

(63) Continuation of application No. PCT/JP2013/005803, filed on Sep. 30, 2013.

(30) Foreign Application Priority Data

Oct. 1, 2012 (JP) .................................. 2012-219113

(51) Int. Cl.
*B23K 9/095* (2006.01)
*B23K 9/23* (2006.01)
(Continued)

(52) U.S. Cl.
CPC ............. *B23K 9/095* (2013.01); *B23K 9/073* (2013.01); *B23K 9/0732* (2013.01); *B23K 9/09* (2013.01);
(Continued)

(58) Field of Classification Search
CPC ...... B23K 9/092; B23K 9/073; B23K 9/0732; B23K 9/12; B23K 9/124; B23K 2101/34; B23K 2101/35
(Continued)

(56) References Cited

U.S. PATENT DOCUMENTS 3,995,138 A 11/1976 Kalev et al.
4,009,365 A 2/1977 Kalev et al.
(Continued)

FOREIGN PATENT DOCUMENTS

CN 1830611 9/2006
CN 102470473 5/2012
(Continued)

OTHER PUBLICATIONS

Machine Translation of JPH06285643A (Year: 1994).*
(Continued)

*Primary Examiner* — Tu B Hoang
*Assistant Examiner* — Erin E McGrath
(74) *Attorney, Agent, or Firm* — Wenderoth, Lind & Ponack, L.L.P.

(57) ABSTRACT

As a conventional problem, welding on surface-treated material, such as a zinc-coated steel plate, considerably generates air holes including blowholes and also generates lots of spatters. Present invention provides a method of controlling arc welding performed in a manner that a short-circuit period, in which a short circuit is generated between a welding wire and an object to be welded, and an arc period, in which an arc is generated after release of the short circuit, are repeated alternately. According to the method, welding current is increased from an arc-regeneration-before current to a first welding current at a detection of release of the short circuit such that an increase gradient of the welding current becomes not less than 750 A/msec. This suppresses genera-
(Continued)

tion of air holes and spatters in welding work on a surface-treated material, such as a zinc-coated steel plate.

5 Claims, 5 Drawing Sheets

(51) Int. Cl.
  *B23K 9/173*    (2006.01)
  *B23K 9/09*    (2006.01)
  *B23K 9/073*    (2006.01)
  *B23K 9/12*    (2006.01)
  *B23K 103/04*    (2006.01)
  *B23K 101/34*    (2006.01)
  *B23K 101/18*    (2006.01)

(52) U.S. Cl.
  CPC .............. *B23K 9/092* (2013.01); *B23K 9/124* (2013.01); *B23K 9/173* (2013.01); *B23K 9/23* (2013.01); *B23K 2101/18* (2018.08); *B23K 2101/34* (2018.08); *B23K 2103/04* (2018.08)

(58) Field of Classification Search
  USPC ................. 219/130.21, 130.1, 130.01, 130.4
  See application file for complete search history.

(56) References Cited

U.S. PATENT DOCUMENTS

| | | | |
|---|---|---|---|
| 5,643,479 | A | 7/1997 | Lloyd et al. |
| 6,087,626 | A | 7/2000 | Hutchison et al. |
| 6,326,591 | B1 | 12/2001 | Hutchinson et al. |
| 6,384,376 | B1 | 5/2002 | Plottier et al. |
| 6,642,483 | B1 | 11/2003 | Koga et al. |
| 2002/0079302 | A1 | 6/2002 | Hutchison et al. |
| 2003/0085210 | A1 | 5/2003 | Hutchison et al. |
| 2004/0074885 | A1 | 4/2004 | Takatani et al. |
| 2004/0188405 | A1* | 9/2004 | Holverson ............. B23K 9/067 219/130.51 |
| 2004/0238513 | A1 | 12/2004 | Hutchison et al. |
| 2006/0118527 | A1 | 6/2006 | Schmitt et al. |
| 2006/0131280 | A1 | 6/2006 | Schmitt et al. |
| 2006/0163229 | A1 | 7/2006 | Hutchison et al. |
| 2006/0201922 | A1 | 9/2006 | Era et al. |
| 2006/0283847 | A1 | 12/2006 | Kawamoto et al. |
| 2007/0102411 | A1* | 5/2007 | Takano ................. B23K 9/125 219/137.71 |
| 2008/0006612 | A1 | 1/2008 | Peters et al. |
| 2008/0006616 | A1 | 1/2008 | Hutchison et al. |
| 2008/0264923 | A1* | 10/2008 | White .................... B23K 9/092 219/137 PS |
| 2008/0314884 | A1 | 12/2008 | Fujiwara et al. |
| 2009/0152252 | A1 | 6/2009 | Kawamoto et al. |
| 2009/0321401 | A1* | 12/2009 | Peters .................... B23K 9/092 219/137 PS |
| 2010/0006552 | A1 | 1/2010 | Hutchison et al. |
| 2010/0108654 | A1 | 5/2010 | Ulrich et al. |
| 2011/0168682 | A1* | 7/2011 | Hagihara ............. B23K 26/244 219/121.64 |
| 2012/0080416 | A1 | 4/2012 | Murakami et al. |
| 2012/0145691 | A1 | 6/2012 | Fujiwara et al. |
| 2012/0255940 | A1 | 10/2012 | Fujiwara et al. |
| 2015/0096965 | A1 | 4/2015 | Kawamoto et al. |

FOREIGN PATENT DOCUMENTS

| | | | |
|---|---|---|---|
| CN | 102652045 | 8/2012 | |
| CN | 104602847 | 12/2016 | |
| DE | 24 59 686 | 7/1975 | |
| EP | 0 904 883 | 3/1999 | |
| EP | 1 985 400 | 10/2008 | |
| JP | 60-108174 | 6/1985 | |
| JP | 61-235079 | 10/1986 | |
| JP | 63-016868 | 1/1988 | |
| JP | 64-018580 | 1/1989 | |
| JP | 03-297569 | 12/1991 | |
| JP | 06-142924 | 5/1994 | |
| JP | H06285643 A * | 10/1994 | ............... B23K 9/23 |
| JP | 06-328253 | 11/1994 | |
| JP | 07-051859 | 2/1995 | |
| JP | 11-267835 | 10/1999 | |
| JP | 2004-181526 | 7/2004 | |
| JP | 2006-021227 | 1/2006 | |
| JP | 2006-142382 | 6/2006 | |
| JP | 2006-334601 | 12/2006 | |
| JP | 2007-216268 | 8/2007 | |
| JP | 2009-233707 | 10/2009 | |
| JP | 2009-269088 | 11/2009 | |
| JP | 2011-098375 | 5/2011 | |
| JP | 2012-081501 | 4/2012 | |
| JP | 2013-010131 | 1/2013 | |
| WO | 03/101658 | 12/2003 | |
| WO | WO2010146844 A1 * | 12/2010 | ............... B23K 9/12 |
| WO | 2011/013305 | 2/2011 | |
| WO | 2011/114679 | 9/2011 | |

OTHER PUBLICATIONS

Machine Translation of WO2010146844 (Year: 2010).*
Office Action dated Apr. 14, 2016 in corresponding Chinese Patent Application No. 201380041961.0 (English translation).
International Search Report of PCT application No. PCT/JP2013/005803 dated Dec. 17, 2013.
English Translation of Chinese Search Report dated Sep. 6, 2015 in Chinese Application No. 201380041961.0.
Notice of Opposition issued Jan. 4, 2018 in European Application No. 13844324.7.
Cuiuri et al., "New Approaches to Controlling Unstable Gas Metal Arc Welding", Australasian Welding, 47(3):39-47 (2002).
Norrish, "Advanced Welding Processes, Technologies and Process Control", Woodhead Publishing Limited, Cambridge, England, edition of 2006, 11 pages.
"The Arc Welding Robot System TAWERS", Brochure from Panasonic, published in Jun. 2009, 16 pages.
TAWERS WG3-Serie mit Navigation, Brochure from Panasonic, Published in Mar. 2012, http://www.mtp-ag.ch/files/cms/mod Shop/425/Panasonic TAWERS WG3.pdf.
"Welding of Coated Steels", Total Materia. Die weltweit umfangreichste Werkstoffdatenbank, http://www.totalmateria.com/page.aspx?ID=CheckArticle&site= kts&NM = 191, Published in Dec. 2006, 4 pages.
English translation of Search Report dated Oct. 23, 2017 in related Chinese Application No. 201611144176.X.

* cited by examiner

ARC WELDING CONTROL METHOD

BACKGROUND

1. Technical Field

The present invention relates to a method of controlling arc welding performed in a manner that, with use of a welding wire as a consumable electrode, a short-circuit period (in which a short circuit is generated between the welding wire and an object to be welded) and an arc period (in which an arc is generated after release of the short circuit) are repeated alternately.

2. Background Art

Conventionally, there have been made some suggestions on decrease in correction processes after arc welding by decreasing spatters generated in arc welding. In one known control method, for example, in an early stage of the arc period after arc regeneration, current is controlled so as to have a current value higher than a current value immediately before the arc regeneration. The current control provides an arc length immediately after arc regeneration with stability and suppresses generation of short circuit, resulting in decrease in spatters (see Japanese Unexamined Patent Application Publication No. 2006-021227, for example).

FIG. 4 shows a waveform of welding current in transitional welding states of a consumable-electrode type arc welding. The horizontal axis shows elapsed time, and the vertical axis shows welding current. In FIG. 4, numeral 101 indicates a short-circuit period where a short circuit occurs between a wire and a base material (i.e., an object to be welded), and numeral 102 indicates an arc period where an arc is generated between the wire and the base material. Numeral 103 indicates an arc regeneration time at which an arc is generated again after short-circuit release. Numeral 104 indicates electric current (in magnitude) immediately before arc regeneration, and numeral 107 indicates electric current (in magnitude) in an early stage of the arc period. Numeral 108 indicates the control time in the early stage of the arc period. Numeral 109 indicates the gradient of increase in welding current from arc-regeneration-before current 104 to early-stage arc current 107.

Increase gradient 109 of welding current is determined to be mild by design. The reason is that steeply increased welding current at arc regeneration wobbles the molten pool and causes unstable movement of a droplet on the tip of the wire. The phenomenon easily causes a feeble short circuit between the wire and the base material, increasing spatters. That is, controlling increase gradient 109 to have mild increase contributes to decrease in spatters.

Besides, early-stage arc current 107 is controlled so as to have a value higher than that of arc-regeneration-before current 104. This allows a droplet to be formed on the tip of the wire in an early stage after arc regeneration, accelerating generation of the next short-circuit and decreasing welding voltage. This further increases welding speed and decreases burn-through in gap welding. Further, the aforementioned current control provides an arc length immediately after arc regeneration with stability and suppresses generation of a short circuit immediately after arc regeneration, resulting in decrease in spatters.

SUMMARY

When a surface-treated steel plate, such as a zinc-coated steel plate, is welded by using the arc welding control method described in background art, defects, such as a pit and a blowhole, occur. At the same time, lots of spatters generate. The description below will explain the reason with reference to FIG. 5.

FIG. 5 shows a section of a bead when a zinc-coated steel plate is welded by using the arc welding control method described in background art.

Upper plate 3 and lower plate 4 are zinc-coated steel plates. Zinc of zinc coating 10 has a boiling point of 907° C., which is lower than the melting point of iron of 1536° C. When a zinc-coated steel plate undergoes arc welding, zinc of zinc coating 10 vaporizes and the zinc vapor leaves from root section 11 via the molten pool for the outside. However, when the molten metal has a fast solidification rate, zinc vapor cannot sufficiently spread outside and an amount of the zinc vapor retains as air hole 16 in welding bead 7 or on the surface of welding bead 7. In that case, air hole 16 retained in welding bead 7 is called a blowhole, while air hole 16 having an opening on the surface of welding bead 7 is called a pit. Such formed blowholes and pits decrease the strength of a welded structure. For instance, in the motor vehicle industry where the zinc-coated steel plate is a much-used material, car manufacturers make efforts for suppressing generation of blowholes and pits; in particular, the generation rate of pits is usually limited in production management.

The zinc vapor generated by welding work on the zinc-coated steel plate moves upward in the molten pool and is released from the surface of the molten pool. At the time, molten metal spouting at the release of zinc vapor is scattered around as spatters, or as another possibility, electric energy generated in a short circuit between the wire and the molten metal spouting at the release of zinc vapor forms spatters. The conventional method, as described above, has another problem of generating lots of spatters.

To address the problems above, the present invention provides the control method of arc welding performed in a manner that a short circuit period (in which a short circuit is generated between the welding wire and an object to be welded) and an arc period (in which an arc is generated after release of the short circuit) are repeated alternately. According to the method above, welding current is increased from an arc-regeneration-before current to a first welding current at a detection of release of the short circuit such that an increase gradient of the welding current becomes not less than 750 A/msec.

According to the control method of arc welding of the present invention, in addition to above, the first welding current should preferably have a current of 300 A or higher.

According to the control method of arc welding of the present invention, in addition to above, upon detecting a constriction phenomenon as a sign indicating the end of a short-circuit period, welding current should preferably be decreased to the arc-regeneration-before current that is lower than the welding current at the detection of the constriction.

According to the control method of arc welding of the present invention, in addition to above, the feeding speed of the welding wire should preferably be periodically changed with a predetermined cycle and a predetermined amplitude.

According to the control method of arc welding of the present invention, in addition to above, the object to be welded should preferably be a surface-treated steel plate.

According to the control method of arc welding of the present invention, in addition to above, the object to be welded should preferably be a zinc-coated steel plate.

The method of the present invention, as described above, minimizes defects, such as a pit and a blowhole, and suppresses spatters in welding on a surface-treated steel plate such as a zinc-coated steel plate.

DETAILED DESCRIPTION OF THE PREFERRED EMBODIMENTS

Exemplary Embodiment

Figure 1:
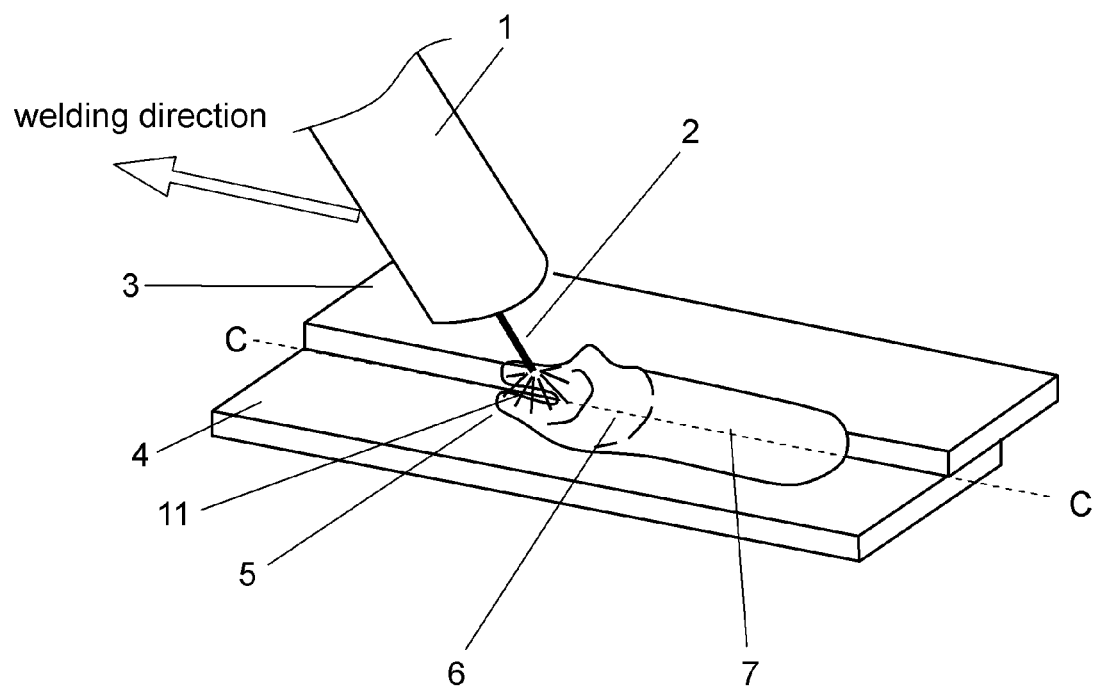
FIG. 1 shows a welding state in accordance with a first exemplary embodiment of the present invention.
Figure 2A:
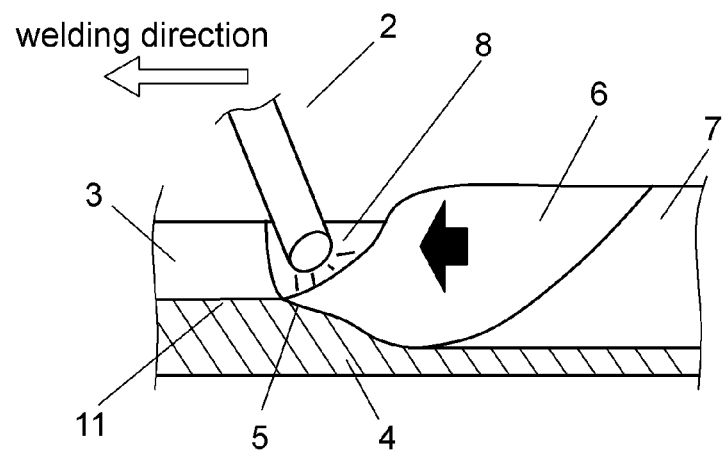
FIG. 2A is a sectional view, seen in the horizontal direction, of a welding area in an arc period in accordance with a conventional arc welding control method.
Figure 2B:
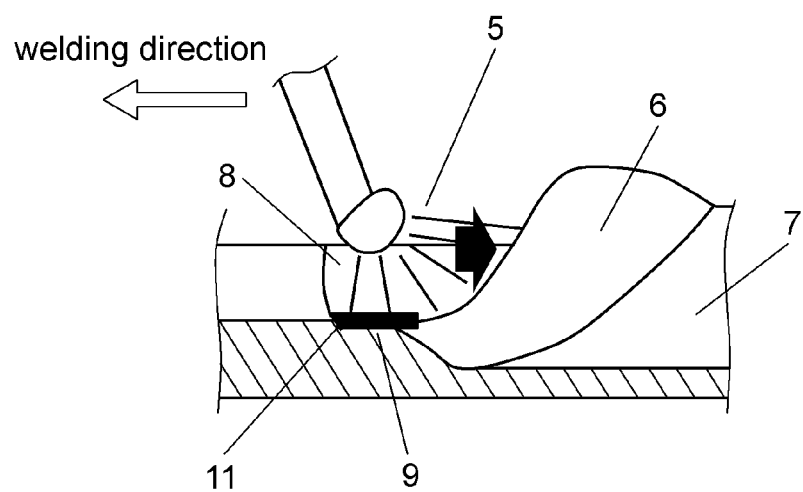
FIG. 2B is a sectional view, seen in the horizontal direction, of a welding area in an arc period in accordance with the first exemplary embodiment of the present invention.
Figure 2C:
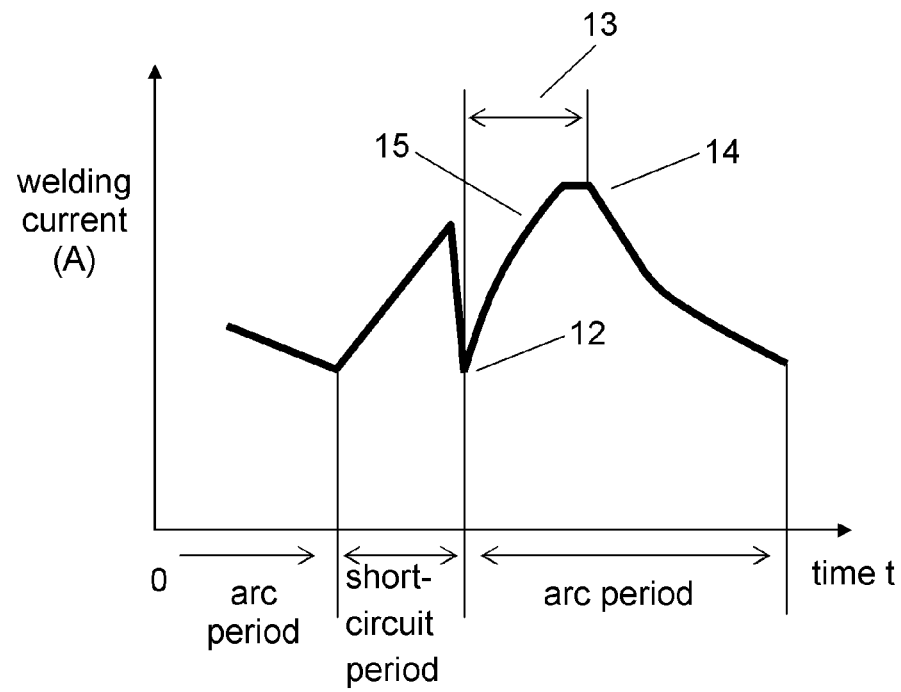
FIG. 2C shows a waveform of welding current in accordance with a conventional arc welding control method.
Figure 2D:
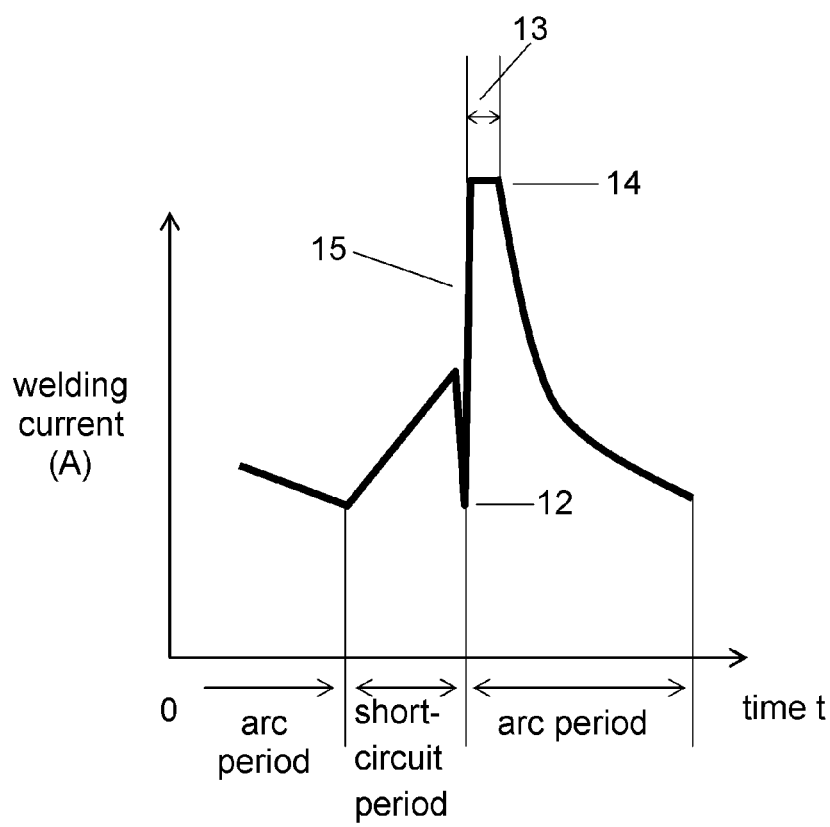
FIG. 2D shows a waveform of welding current in accordance with the first exemplary embodiment of the present invention.

FIG. 1 shows a welding state in the arc welding control method in accordance with this exemplary embodiment. FIG. 2A is a sectional view (corresponding to the sectional view taken away line C-C of FIG. 1), seen in the horizontal direction, of a welding area in an arc period in accordance with a conventional arc welding control method. FIG. 2B is a sectional view (i.e., the sectional view taken away line C-C of FIG. 1), seen in the horizontal direction, of a welding area in an arc period in accordance with this exemplary embodiment. FIG. 2C shows a waveform of welding current in accordance with a conventional arc welding control method. FIG. 2D shows a waveform of welding current in accordance with arc welding control method of this exemplary embodiment. FIG. 2A relates to FIG. 2C, showing a welding state in first predetermined period 13 in FIG. 2C. Similarly, FIG. 2B relates to FIG. 2D, showing a welding state in first predetermined period 13 in FIG. 2D.

Figure 4:
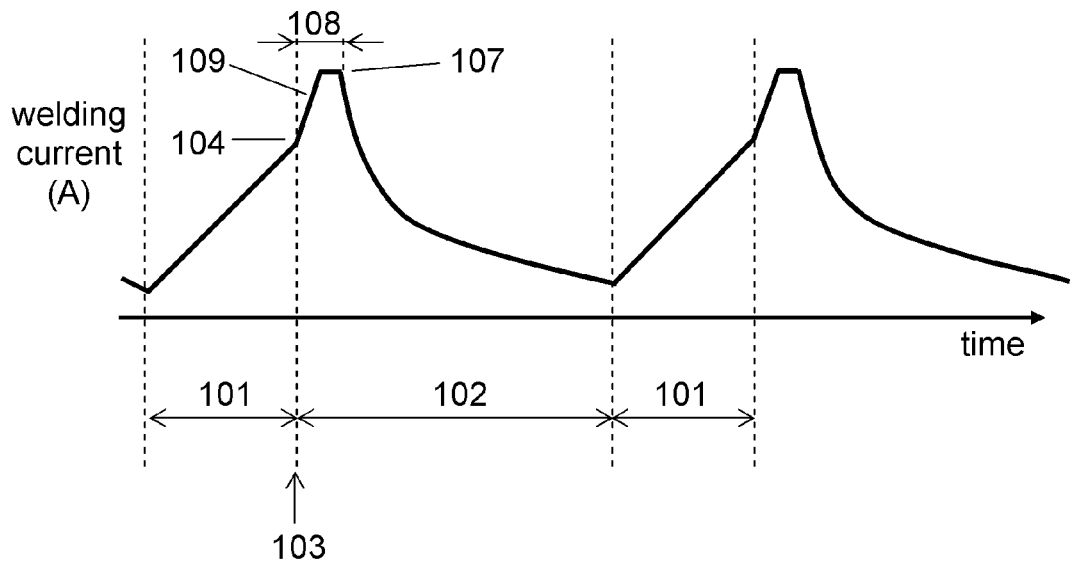
FIG. 4 shows change with the passage of time in welding current in accordance with a conventional arc welding control method.
Figure 5:
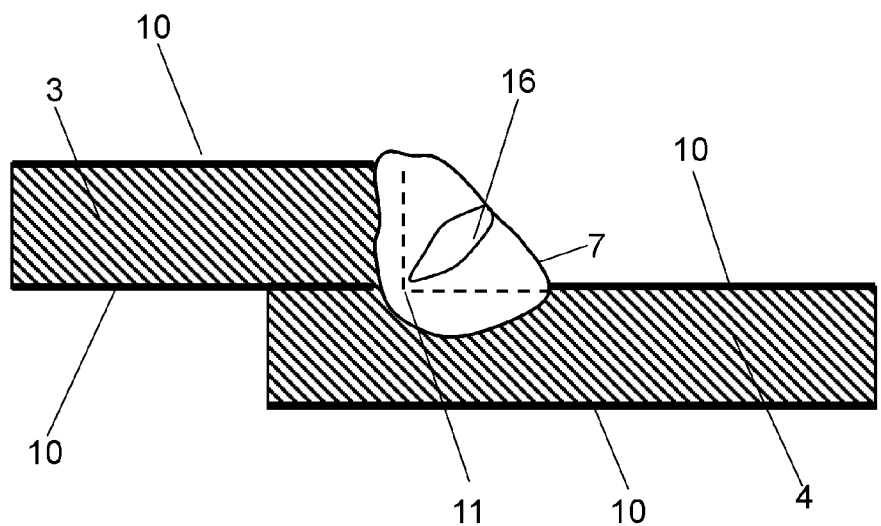
FIG. 5 shows a section of a welding bead when a zinc-coated steel plate is welded by a conventional arc welding control method.

Throughout the drawings, the parts similar to those in FIG. 4 and FIG. 5 described in background art have similar reference marks and an overlapping section in the description will be omitted. The exemplary embodiment describes welding applied to a zinc-coated steel plate as a surface-treated material.

FIG. 1 shows a state of a welding area by a welding power-supply device, a wire feeding device, and an industrial robot (not shown). In FIG. 1, for instance, a wire feeding device (not shown) automatically feeds welding wire 2 via welding torch 1 attached to a manipulator (not shown) forming an industrial robot. In the process above, a welding power-supply device (not shown) provides wire 2 with electric power so as to generate arc 5 between wire 2 and the zinc-coated steel plate having upper plate 3 and lower plate 4. Arc 5 melts wire 2, upper plate 3, and lower plate 4, by which upper plate 3 is welded to lower plate 4.

In the exemplary embodiment, as shown by a black arrow in FIG. 2B, arc 5 exerts arc force on molten pool 6 in a direction opposite to the proceeding direction of welding; that is, receiving pushing force, molten pool 6 moves in a direction opposite to the welding proceeding direction. Due to the opposite movement, root section 11 (that is an overlapped section of upper plate 3 and lower plate 4) is exposed. Root section 11 has a length corresponding to the length of upper plate 3 and lower plate 4. The exposed section of root section 11 that undergoes welding is shown as exposed section 9 in FIG. 2B.

A welding area is highly heated by arc heat of arc 5 and heat transferred from molten pool 6, and the melted area of upper plate 3 and lower plate 4 has melting section 8. The temperature of melting section 8 becomes higher than the boiling point of zinc, by which zinc is vaporized. According to the exemplary embodiment, as shown in FIG. 1 and FIG. 2B, molten pool 6 is pushed in a direction opposite to the welding proceeding direction, by which exposed section 9 is exposed at root section 11 of upper plate 3 and lower plate 4. Zinc vapor is easily released to the outside through exposed section 9. That is, the zinc-coat vaporized section—from which zinc is vaporized—has no zinc.

When exposed section 9 shown in FIG. 2B is completely exposed by the arc force of arc 5, zinc vapor is released to the outside without traveling in molten pool 6. Compared to the case where zinc vapor travels through molten pool 6, zinc vapor easily goes to the outside, which suppresses generation of pits and blowholes. This also eliminates of spatters that are often generated with release of zinc vapor.

Even when exposed section 9 is covered with a part of molten pool 6 in FIG. 2B, as long as the part over exposed section 9 has a thickness of approximately 0.5 mm or smaller, zinc vapor is easily released through the part to the outside. That is, zinc vapor generated from upper plate 3 and lower plate 4 expands its volume by heat and breaks through molten pool 6 that covers exposed section 9.

According to the arc welding control method of the exemplary embodiment, as described above, arc 5 exerts arc force on molten pool 6 to move in a direction opposite to the welding proceeding direction in an arc period. Receiving arc heat and heat transferred from molten pool 6, highly heated root section 11 is exposed as exposed section 9, and through which zinc vapor vaporized from the zinc-coated steel plate is easily released to the outside. That is, zinc vapor released to the outside through exposed section 9 increases; in other words, zinc vapor released to the outside through molten pool 6 decreases. This significantly suppresses air hole 16 in welding bead 7.

In the process above, the force necessary for pushing molten pool 6 is arc force caused by welding current in an arc period. In addition, a large amount of arc force is needed when arc length is short. Providing a large current at the moment of short-circuit release produces large arc force, increasing the pushing force on molten pool 6. Specifically, the important parameters for producing large arc force are increase gradient 15 (of welding current) between arc-regeneration-before current 12 and first welding current 14, and the magnitude of first welding current 14.

Conventionally, increase gradient 15 (of welding current) is moderately determined by design. The reason is as follows; a steep rise of welding current wobbles the molten pool or provides a droplet with an unstable movement, which easily causes a feeble short circuit, and results in lots of spatters.

This is also true for the welding on the zinc-coated steel plate of the exemplary embodiment. Increase gradient 15 (of welding current) shown in FIG. 2D has a rise steeper than conventional increase gradient 15 (of welding current) shown in FIG. 2C. Such a steep increase in welding current wobbles the molten pool or provides a droplet with an unstable movement, increasing spatters due to a feeble short circuit. Generally, in welding on a zinc-coated steel plate, generation of spatters caused by release of zinc vapor has more frequency than that caused by a feeble short circuit. As described earlier, zinc vapor is easily released by providing increase gradient 15 with steepness and increasing the force pushing molten pool 6. Therefore, the steep rise of welding current considerably suppresses the spatters due to release of zinc vapor.

That is, a steep rise of increase gradient 15 of welding current after short-circuit release increases spatters due to a feeble short circuit but suppresses spatters due to evaporation of zinc. Besides, generation of spatters caused by release of zinc vapor has more frequency than that caused by a feeble short circuit. As a result, providing increase gradient 15 of welding current with steepness allows spatters to have decrease in a total amount of generation.

The aforementioned arc welding control method of the exemplary embodiment considerably suppresses generation of pits and blowholes, too.

Besides, increasing first welding current 14 also increases the force pushing molten pool 6, extending the area of exposed section 9. This contributes to decrease in spatters, pits, and blowholes. In FIG. 2C and FIG. 2D, first predetermined time 13 is the period from generation of an arc to the end of application of first welding current 14. FIG. 2C and FIG. 2D show an example in which welding current is controlled as follows. Upon detecting a constriction phenomenon as a sign indicating the end of a short-circuit period in the short-circuit period, welding current is decreased to arc-regeneration-before current 12 smaller than the welding current at which the constriction phenomenon was detected. Upon detecting short-circuit release, the welding current is increased with increase gradient 15.

Table 1 shows a relationship between a combination of first welding current 14 and increase gradient 15 (between arc-regeneration before current 12 and first welding current 14) and a defect. If a visual inspection and an X-ray analysis after welding work cannot find any defect on the surfaces or inside, Table 1 shows "○"; otherwise, "x".

TABLE 1

| | Increase gradient (A/msec) | | | | | | | |
|---|---|---|---|---|---|---|---|---|
| | First welding current (A) | | | | | | | |
| | 250 | 300 | 350 | 400 | 450 | 500 | 550 | 600 |
| 500 | x | x | x | x | x | x | x | x |
| 750 | x | ○ | ○ | ○ | ○ | ○ | ○ | ○ |
| 1000 | x | ○ | ○ | ○ | ○ | ○ | ○ | ○ |
| 1500 | x | ○ | ○ | ○ | ○ | ○ | ○ | ○ |
| 2000 | x | ○ | ○ | ○ | ○ | ○ | ○ | ○ |
| 3000 | x | ○ | ○ | ○ | ○ | ○ | ○ | ○ |
| 4000 | x | ○ | ○ | ○ | ○ | ○ | ○ | ○ |

[defect] not found: ○/found: x

Table 1 shows that the proper value of increase gradient 15 (of welding current) is 750 A/msec or greater, and the proper value (i.e., the current maximum value) of first welding current 14 is 300 A or greater. When the aforementioned condition was satisfied, there was no surface defect observed by visual inspection, i.e., there was no pit; at the same time, generation of blowholes found by an X-ray analysis was suppressed. Further, spatters were suppressed. In contrast, when the condition was not satisfied, lots of pits and blowholes were observed, and spatters increased.

As described above, determining increase gradient 15 (of welding current) and the maximum current value of first welding current 14 to a proper value allows welding to have decrease in pits, blowholes, and spatters.

First welding current 14 should be at least 300 A and increase gradient 15 (of welding current) should be at least 750 A/msec. Practically, however, the output of first welding current 14 and increase gradient 15 depend on the capability of a welding power supply device that outputs welding current. If increase gradient 15 exceeds 4000 A/msec, the force pushing the molten pool excessively increases, causing generation of a feeble short circuit and unstable movement of a droplet. As a result, spatters increase. Preferably, increase gradient 15 (of welding current) should be at least 750 A/msec and at most 4000 A/msec.

Table 1 shows a result of the welding performed under the following conditions:
  welding method: MAG welding
  wire: solid wire with a diameter of 1.2 mm
  joint type: lap joint with a plate thickness of 2.3 mm
  coating weight: 45 g/m²

$CO_2$-welding offers an arc concentration (directivity) higher than that in MAG welding. Therefore, the maximum value of first welding current 14 in $CO_2$-welding should preferably be 450 A or less. If the maximum value of first welding current 14 exceeds 450 A, burn-through easily occurs in the object with a certain plate thickness.

As shown in FIG. 2C and FIG. 2D, upon detecting a constriction phenomenon of wire 2—a sign of short-circuit release—just before arc generation, the welding current is steeply decreased to a value smaller than the welding current just before arc generation. That is, welding current is steeply decreased to arc-regeneration-before current 12 smaller than the welding current at which the constriction phenomenon was detected. This decreases spatters at arc generation.

Besides, welding performance is improved by repeating normal feeding (forward feeding) for feeding wire 2 toward the object to be welded and reverse feeding (backward feeding) for feeding wire 2 away from the object. In the backward feeding of wire 2, determining the distance between wire 2 and molten pool 6 to, for example, approximately 1 mm to 10 mm improves stability of welding. That is, the backward feeding of wire 2 allows the distance between the tip of wire 2 and molten pool 6 to be large, suppressing a feeble short circuit; and accordingly, suppressing generation of spatters.

Further, feeding speed in the forward feeding is higher than that in the commonly-used welding at constant feeding speed, so that a short circuit is easily generated without fail. This is effective in decreasing spatters. In the backward feeding, a short circuit is released mechanically and therefore released without fail. This suppresses a feeble short circuit generated immediately after short-circuit release, decreasing spatters. According to the exemplary embodiment, as shown in FIG. 3, while wire 2 is being fed reversely (i.e., by backward feeding), a short-circuit period ends and an arc period starts; and while wire 2 is being fed normally (i.e., by forward feeding), an arc period ends and a short-circuit period starts.

Figure 3:
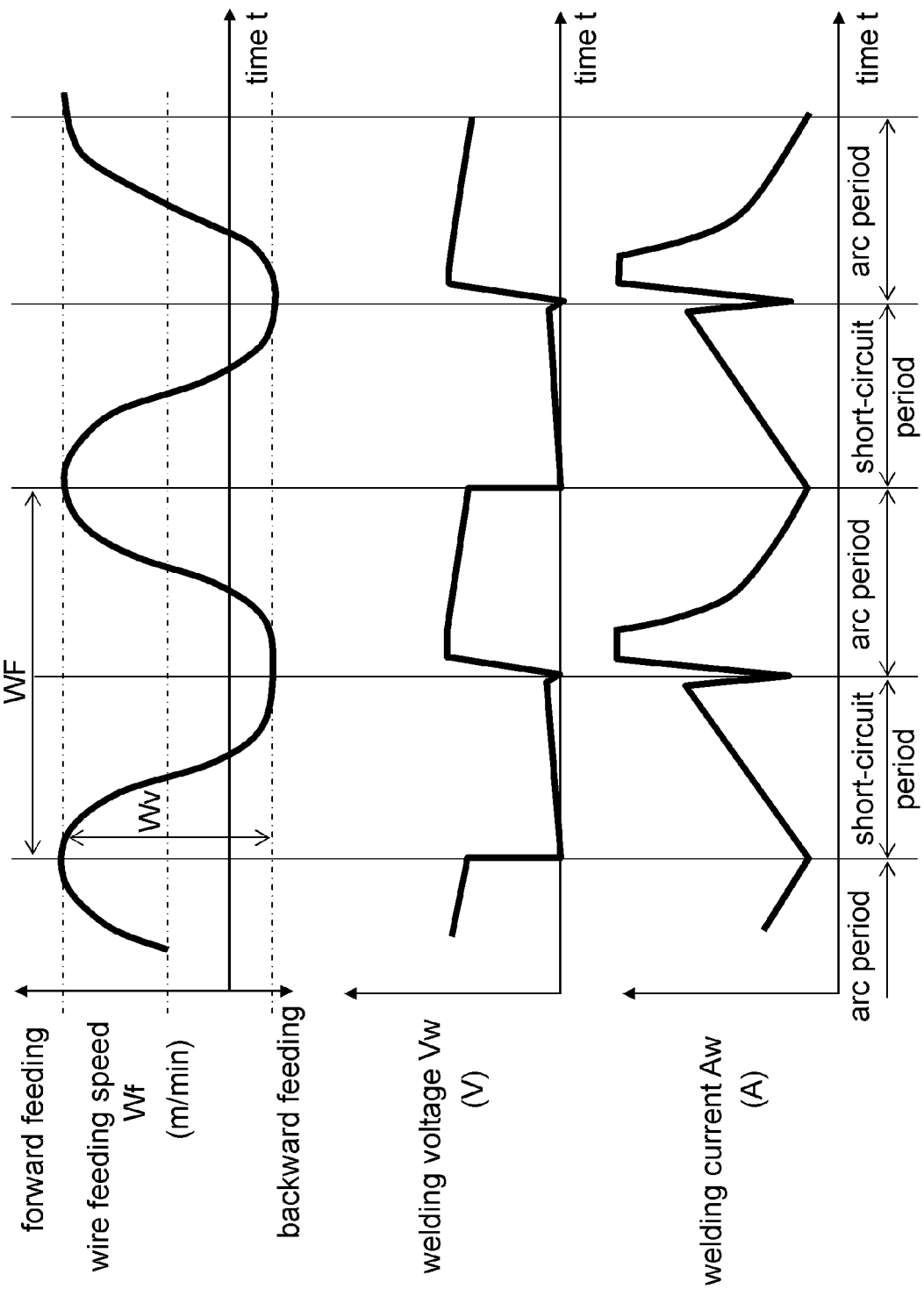
FIG. 3 shows change with the passage of time in the wire feeding speed, welding voltage, and welding current in accordance with the first exemplary embodiment of the present invention.

As for the aforementioned forward/backward feeding control of wire 2, as shown in FIG. 3, the forward/backward feeding of the wire feeding speed may be repeated on a periodic basis with a predetermined cycle WF and a predetermined amplitude Wv. FIG. 3 shows an example of periodic feeding with a sinusoidal waveform, but it is not limited to. The waveform may be trapezoidal or saw-toothed shape, as long as being periodic.

Instead of the periodic feeding control shown in FIG. 3, the following (not shown) is another possibility. Upon detecting the short-circuit condition of welding, backward feeding is performed, and upon detecting the arc condition of welding, forward feeding is performed.

According to the present invention, when a surface-treated base material, such as a zinc-coated steel plate, is welded with use of a welding wire, generating force pushing the molten pool allows a root section of an overlapped area of the materials to be exposed. Gaseous zinc evaporated from the material is easily released through the exposed section. This considerably suppresses generation of air holes such as a blowhole and also suppresses generation of spatters. Therefore, the present invention is useful as a method of controlling arc welding on a base material from which vapor is generated in welding work, for example, a zinc-coated steel plate and other surface-treated materials.

What is claimed is:

1. A method of controlling arc welding for a surface-treated welding object to be welded including an upper plate and a lower plate, the method comprising:
   welding the object by alternately repeating a short-circuit period, in which a short circuit is generated between a welding wire and the object to be welded, and an arc period, in which an arc is generated after release of the short circuit;
   upon detecting a constriction of the welding wire, decreasing a welding current to a before-arc-regeneration current having a value which is lower than a value of the welding current at the detection of the constriction;
   upon detecting a release of the short circuit, increasing the welding current from the before-arc-regeneration current to a first welding current of not less than 300 A at an increase gradient larger than 1000 A/ms and not larger than 4000 A/ms;
   welding the object such that a molten pool is pushed and moved by an arc force of the arc produced in the arc period in a direction opposite to a welding proceeding direction so that a root section which is an overlapped section of the upper plate and the lower plate is exposed to allow releasing a generated vapor to the outside; and
   feeding the welding wire by alternately repeating a forward feeding to feed the welding wire toward the object and a backward feeding to feed the welding wire away from the object, wherein the short-circuit period ends and the arc period starts while the welding wire is being fed by the backward feeding, and the welding current is increased from the before-arc-regeneration current to the first welding current while the welding wire is being fed by the backward feeding.

2. The method of controlling arc welding according to claim 1, further comprising changing a feeding speed of the welding wire periodically with a predetermined cycle and a predetermined amplitude.

3. The method of controlling arc welding according to claim 1, wherein the object to be welded is a zinc-coated steel plate.

4. The method of controlling arc welding according to claim 1,
   wherein said feeding the welding wire comprises feeding the welding wire in the backward feeding to cause a distance between the welding wire and the molten pool to range from 1 mm to 10 mm.

5. The method of controlling arc welding according to claim 1,
   wherein a welding torch for feeding the welding wire is inclined with respect to the object to be welded such that a tip of the welding torch is disposed in a direction opposite to the welding proceeding direction.

* * * * *